US011243591B2

(12) United States Patent
Yang et al.

(10) Patent No.: US 11,243,591 B2
(45) Date of Patent: Feb. 8, 2022

(54) UNINTERRUPTIBLE POWER SYSTEM AND OPERATION METHOD THEREOF

(71) Applicant: CYBER POWER SYSTEMS, INC., Taipei (TW)

(72) Inventors: Chao-Ching Yang, Taipei (TW); Chun-Wei Lu, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 118 days.

(21) Appl. No.: 16/676,084

(22) Filed: Nov. 6, 2019

(65) Prior Publication Data
US 2020/0285290 A1 Sep. 10, 2020

(30) Foreign Application Priority Data
Mar. 8, 2019 (CN) .......................... 201910174838.5

(51) Int. Cl.
*G06F 1/26* (2006.01)
*H02J 9/06* (2006.01)
(Continued)

(52) U.S. Cl.
CPC .............. *G06F 1/263* (2013.01); *G06F 3/147* (2013.01); *G06F 16/2282* (2019.01); *H02J 9/06* (2013.01); *H02J 9/062* (2013.01)

(58) Field of Classification Search
CPC ...... H02J 9/062; H02J 9/061; H02J 13/00001; H02J 9/06; G06F 1/263; G06F 3/04817; G06F 3/147; Y04S 20/248; Y04S 10/40
See application file for complete search history.

(56) References Cited

U.S. PATENT DOCUMENTS 6,201,371 B1 * 3/2001 Kawabe .................. H02J 9/062
320/121
6,205,322 B1 * 3/2001 Muramatsu ............ G08B 5/229
340/7.53
(Continued)

FOREIGN PATENT DOCUMENTS

CN 109428393 A 3/2019

OTHER PUBLICATIONS

Eaton, "Installation and user manual", 2010, retrieved from https://www.eaton.com/content/dam/eaton/products/backup-power-ups-surge-it-power-distribution/backup-power-ups/eaton-5px-ups/eaton-5px-ups-manual-northamerica.pdf (Year: 2010).*
(Continued)

*Primary Examiner* — Ryan Johnson
(74) *Attorney, Agent, or Firm* — Bacon & Thomas, PLLC

(57) ABSTRACT

An uninterruptible power system and an operation method thereof are provided. The uninterruptible power system has a plurality of function blocks which form a topology structure of the uninterruptible power system. The uninterruptible power system comprises a sensing circuit and a control circuit. The sensing circuit is configured to sense the function blocks and to generate a sensing data accordingly. The control circuit is configured to determine, according to the sensing data, whether an event occurs in any of the function blocks. When the determination is yes, the control circuit generates an event code corresponding to the event and outputs a control command accordingly. The control command is used to control a display interface to display the event code, and is used to control the display interface to send a prompt message through a function block graphic symbol corresponding to the event code in the displayed topology structure.

9 Claims, 5 Drawing Sheets

(51) Int. Cl.
    *G06F 16/22*     (2019.01)
    *G06F 3/147*     (2006.01)

(56) References Cited

U.S. PATENT DOCUMENTS

| | | | |
|---|---|---|---|
| 9,837,855 B2* | 12/2017 | Prakash | H02J 9/062 |
| 2003/0132949 A1* | 7/2003 | Fallon | G06F 1/28 |
| | | | 715/700 |

OTHER PUBLICATIONS

Eaton, "Interact with a 5px", retrieved from http://powerquality.eaton.com/products-services/backup-power-ups/5px-ups/5pxdemo/ on May 3, 2021 (Year: 2021).*

American Power Conversion Corp, "The Different Types of UPS Systems", Oct. 2004, retrieved from https://www.eetimes.com/the-different-types-of-ups-systems/ (Year: 2004).*

Furlong, Edward R. "UPS topologies for large critical power systems (> 500 KVA)." Proceedings of the 13th Annual Power Quality Exhibition & Conference, Atlanta, GA, USA. vol. 30. 2002. (Year: 2002).*

* cited by examiner

UNINTERRUPTIBLE POWER SYSTEM AND OPERATION METHOD THEREOF

BACKGROUND OF THE INVENTION

Field of the Invention

The present invention relates to the technical field of power supply, and more particularly, to an uninterruptible power system.

Description of Related Art

An uninterruptible power system (UPS) is used to provide backup power to required devices (e.g., computers, servers, or medical equipment) when AC mains fails, so that the devices can still in normal operation in this case.

However, the traditional uninterruptible power system does not provide intuitive information to the user in the event of a malfunction or an event that requires warning to the user, so that the user cannot quickly troubleshoot or respond. Therefore, how to solve the above problems has become an important issue.

SUMMARY OF THE INVENTION

An object of the present invention is to provide an uninterruptible power system, which can provide intuitive information to the user in the event of a malfunction or an event that requires warning to the user, so that the user can quickly troubleshoot or respond.

Another object of the present invention is to provide an operation method corresponding to the aforementioned uninterruptible power system.

To achieve the above object, the present invention provides an uninterruptible power system. The uninterruptible power system has a plurality of function blocks, and the function blocks form a topology structure of the uninterruptible power system. The uninterruptible power system comprises a sensing circuit and a control circuit. The sensing circuit is configured to sense the function blocks and to generate a sensing data accordingly. The control circuit is configured to determine, according to the sensing data, whether an event occurs in any of the function blocks. When the determination is yes, the control circuit generates an event code corresponding to the event and outputs a control command accordingly. The control command is used to control a display interface to display the event code, and is used to control the display interface to send a prompt message through a function block graphic symbol corresponding to the event code in the displayed topology structure.

To achieve the above another object, the present invention further provides an operation method of an uninterruptible power system, wherein the uninterruptible power system has a plurality of function blocks that form a topology structure of the uninterruptible power system. The operation method comprises the following steps: sensing the function blocks through a sensing circuit and generating a sensing data accordingly; determining whether an event occurs in any of the function blocks according to the sensing data; and when the determination is yes, enabling a control circuit to generate an event code corresponding to the event and accordingly output a control command for controlling a display interface to display the event code, and for controlling the display interface to send a prompt message through a function block graphic symbol corresponding to the event code in the displayed topology structure.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments, that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
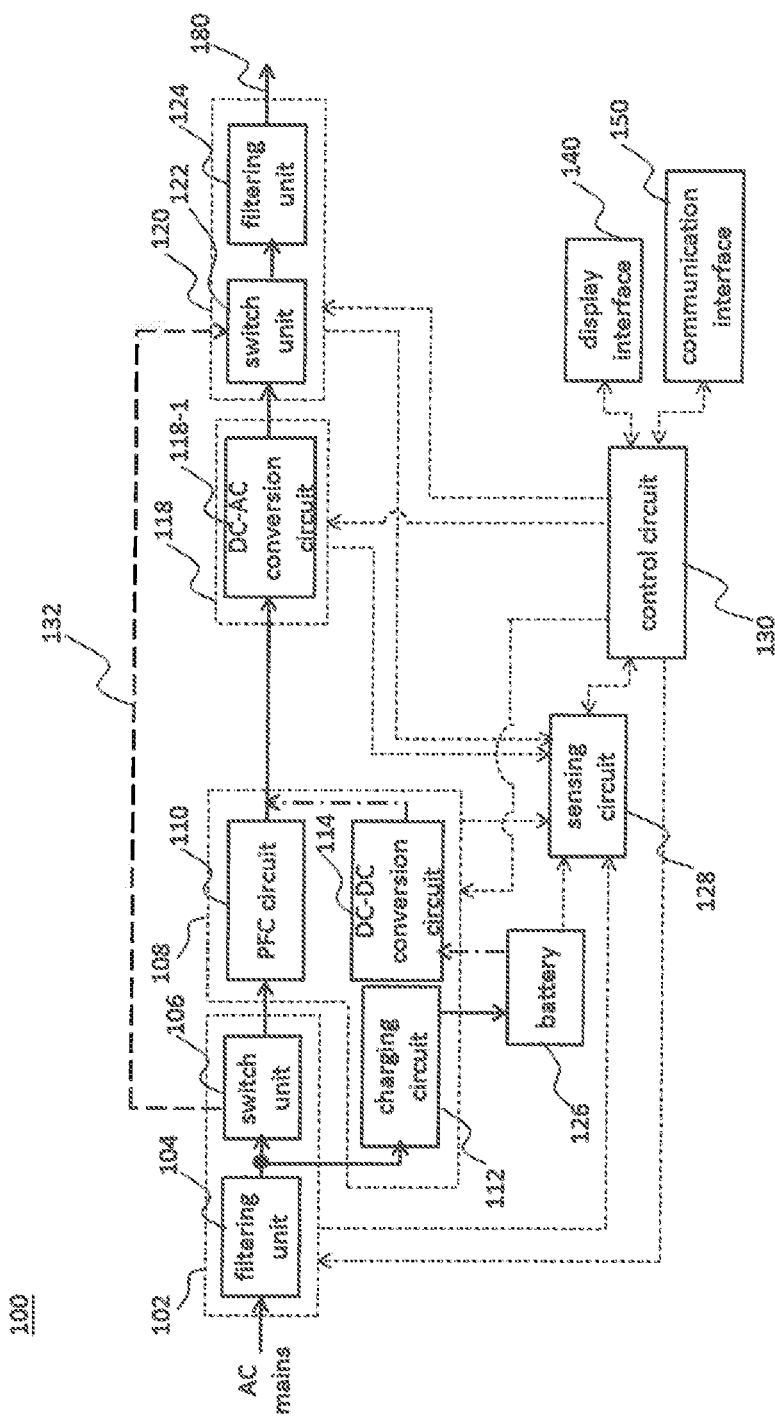
FIG. 1 shows an uninterruptible power system according to an embodiment of the present invention.

FIG. 1 shows an uninterruptible power system according to an embodiment of the present invention. Referring to FIG. 1, the uninterruptible power system 100 is an on-line uninterruptible power system, which has a plurality of function blocks that form the topology structure of the uninterruptible power system 100. The function blocks comprise an input unit 102, a first voltage conversion unit 108, a second voltage conversion unit 118, an output unit 120, and a battery 126. In this embodiment, the input unit 102 comprises a filtering unit 104 and a switch unit 106. The first voltage conversion unit 108 comprises a power factor correction circuit (PFC circuit) 110, a charging circuit 112, and a DC-DC conversion circuit 114. The second voltage conversion unit 118 comprises a DC-AC conversion circuit 118-1. The output unit 120 comprises a switch unit 122 and a filtering unit 124. In addition, the uninterruptible power system 100 further comprises a sensing circuit 128, a control circuit 130, and a display interface 140.

The sensing circuit 128 is electrically coupled to the input unit 102, the first voltage conversion unit 108, the second voltage conversion unit 118, the output unit 120, and the battery 126, so as to measure these function blocks to obtain voltage information, current information, power information, temperature information, and other related information. The control circuit 130 is electrically coupled to the sensing circuit 128, so as to receive the sensing data outputted from the sensing circuit 128. In addition, the control circuit 130 is electrically coupled to the input unit 102, the first voltage conversion unit 108, the second voltage conversion unit 118, the output unit 120, the battery 126, and the display interface 140, so as to control their operations. For example, the control circuit 130 is configured to control the switch unit 106 to provide the output of the filtering unit 104 to the bypass path 132, or to provide the output of the filtering unit 104 to the input of the power factor correction circuit 110. The control circuit 130 is further configured to control the switch unit 122 to electrically couple the input of the filter unit 124 to the output of the DC-AC conversion circuit 118-1, or to electrically couple the input of the filter unit 124 to the bypass path 132, so as to supply power required by the backend devices through the output terminal 180 of the uninterruptible power system 100.

After measuring the function blocks and generating a sensing data accordingly, the control circuit 130 determines, according to the sensing data, whether an event occurs in any of the function blocks (i.e., an event of a malfunction or an event that requires warning to the user occurs). When the determination is yes, the control circuit 130 generates an event code corresponding to the event, and outputs a control command accordingly. The control command is used to control the display interface 140 to display the event code, and is used to control the display interface 140 to send a prompt message through a function block graphic symbol corresponding to the event code in the displayed topology structure.

Figure 2:
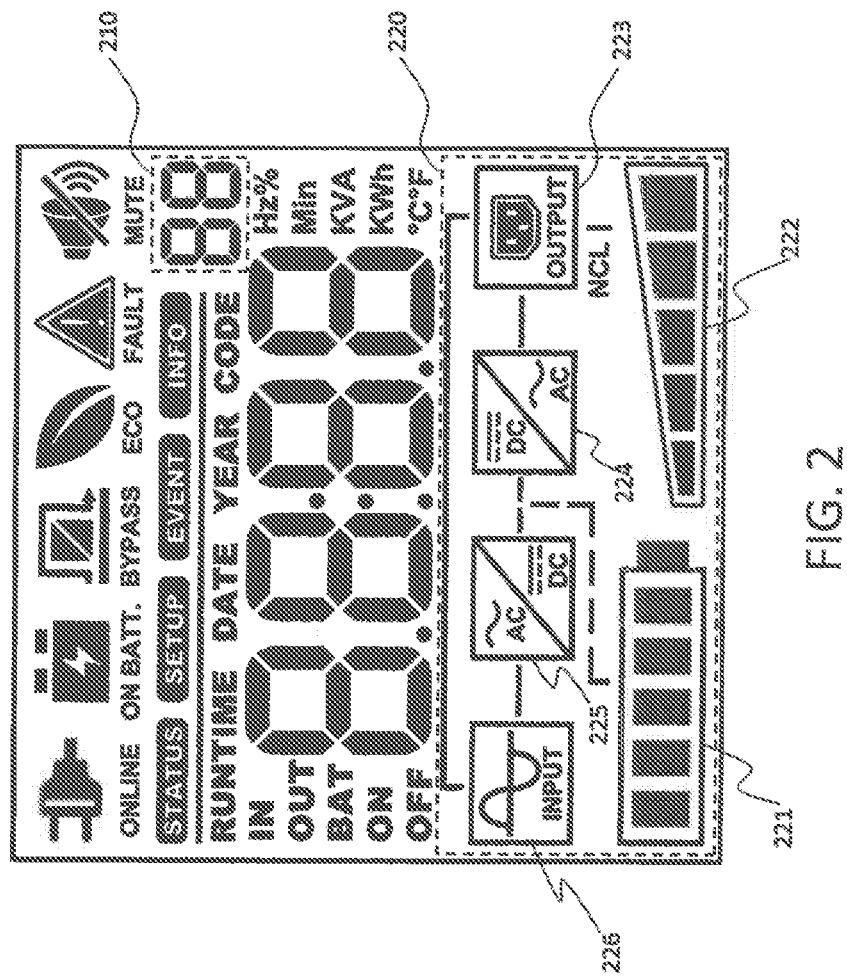
FIG. 2 shows one of the images displayed by the display interface 140.

The event code comprises at least two characters, and the characters may comprise letters, numbers, punctuation marks, other symbols, and the like. These characters are divided into two parts, and a part of the characters are used to represent an index. FIG. 2 shows one of the images displayed by the display interface 140. As can be seen from the image 200 shown in FIG. 2, the display interface 140 is used to display related information of the uninterruptible power system 100, and is used to display the topology structure of the uninterruptible power system 100 (as indicated by the reference numeral 220) and the aforementioned event code (as indicated by the reference numeral 210). The topology structure 220 displayed by the display interface 140 comprises a plurality of function block graphic symbols, including an input unit graphic symbol 226, a first voltage conversion unit graphic symbol 225, a second voltage conversion unit graphic symbol 224, an output unit graphic symbol 223 and a battery graphic symbol 221. In addition, the topology structure 220 displayed by the display interface 140 also comprises a load graphic symbol 222. As shown in FIG. 2, in this embodiment, the event code is represented by two numbers. The digit in tens of the event code represents the aforementioned index, and the digit in ones of the event code represents a status number. It should be noted that the information in the image shown in FIG. 2 is for example only and is not intended to limit the present invention.

After the control circuit 130 generates an event code corresponding to the event, the control circuit 130 searches out a function block corresponding to the index from a lookup table, and accordingly generates the control command. The lookup table records the correspondence between the function blocks and a plurality of different indexes, as shown in Table 1 below:

TABLE 1

| Event Code | Index | Function Block | Status Number | Status Information |
|---|---|---|---|---|
| 00~09 | 0 | Battery | 1 | Overcharge |
| | | | 2 | Charger failure |
| | | | 4 | Battery voltage is too low |
| | | | 5 | Battery failure |
| | | | 6 | Battery is not connected |
| | | | 7 | Replace the battery |
| | | | 8 | Battery voltage is too high |
| | | | Other | Reserved |
| 10~19 | 1 | Load | | Skipped |
| 20~29 | 2 | Output unit | | Skipped |
| 30~39 | 3 | Second voltage conversion unit | | Skipped |
| 40~49 | 4 | First voltage conversion unit | | Skipped |
| 50~59 | 5 | Input unit | | Skipped |

For the sake of brevity, the status numbers and their corresponding status information of index 1 to index 5 in Table 1 are omitted. In addition, the status numbers and their corresponding status information of index 0 are for illustrative purposes only and are not intended to limit the present invention. Certainly, the lookup table may record the information of the indexes and the function blocks only. In addition, the aforementioned lookup table is stored in an internal memory space of the control circuit 130, or stored in an external memory (not shown) electrically coupled to the control circuit 130.

Assume that the control circuit 130 generates an event code 01. The control circuit 130 determines that the index of the event code 01 is the number 0, searches out the battery which is the function block corresponding to the number 0 from the lookup table, and generates a control command accordingly. Then, the control circuit 130 outputs the control command to the display interface 140, so as to control the display interface 140 to display the event code 01, and control the display interface 140 to send a prompt message through the displayed battery graphic symbol 221. For example, the display interface 140 can, according to the aforementioned control command, send the prompt message by emitting light through the battery graphic symbol 221 or its surroundings, or by flashing the battery graphic symbol 221 or its surroundings. In this way, the uninterruptible power system 100 can provide intuitive information to the user in the event of a malfunction or an event that requires warning to the user, so that the user can quickly troubleshoot or respond.

The display interface 140 can be implemented by a liquid-crystal display (LCD), an electrophoretic display (EPD), a plasma display, or an organic light-emitting diode display (OLED display). In addition, the aforementioned LCD can be implemented by a graphic LCD, which comprises a patterned transparent film and a monochrome LCD. In this embodiment, the patterned transparent film has a plurality of graphic symbols to display related information of the uninterruptible power system 100. For example, it may have the graphic symbols as shown in FIG. 2.

In addition, the uninterruptible power system 100 further comprises a communication interface 150, and the control circuit 130 further transmits the control command to a terminal (not shown) through the communication interface 150, so as to display the event code through the display interface of the terminal, and control the display interface to send a prompt message through a function block graphic symbol corresponding to the event code in the displayed topology structure. The communication interface 150 can be implemented by a Bluetooth communication module, a Wi-Fi (wireless fidelity) communication module, a network communication module, a USB (universal serial bus) communication module, an RS232 communication module, a CANbus (controller area network bus) communication module, or a Modbus communication module. The terminal comprises a desktop computer, a notebook computer, a tablet computer or a mobile phone. Certainly, in the case of having the communication interface 150, the uninterruptible power system 100 may not adopt the display interface 140.

It is worth mentioning that although the uninterruptible power system 100 adopts the filtering units 104 and 124, whether or not to adopt the two filtering units can be determined according to actual design requirements. In addition, the battery 126 and the bypass path 132 may be disposed inside or outside of the uninterruptible power system 100 depending on actual design requirements.

Although in the foregoing description, an on-line uninterruptible power system is taken as an example, this is not intended to limit the present invention, and those skilled in the art should know that an off-line uninterruptible power system and a line-interactive uninterruptible power system can also be operated as described above.

Figure 3:
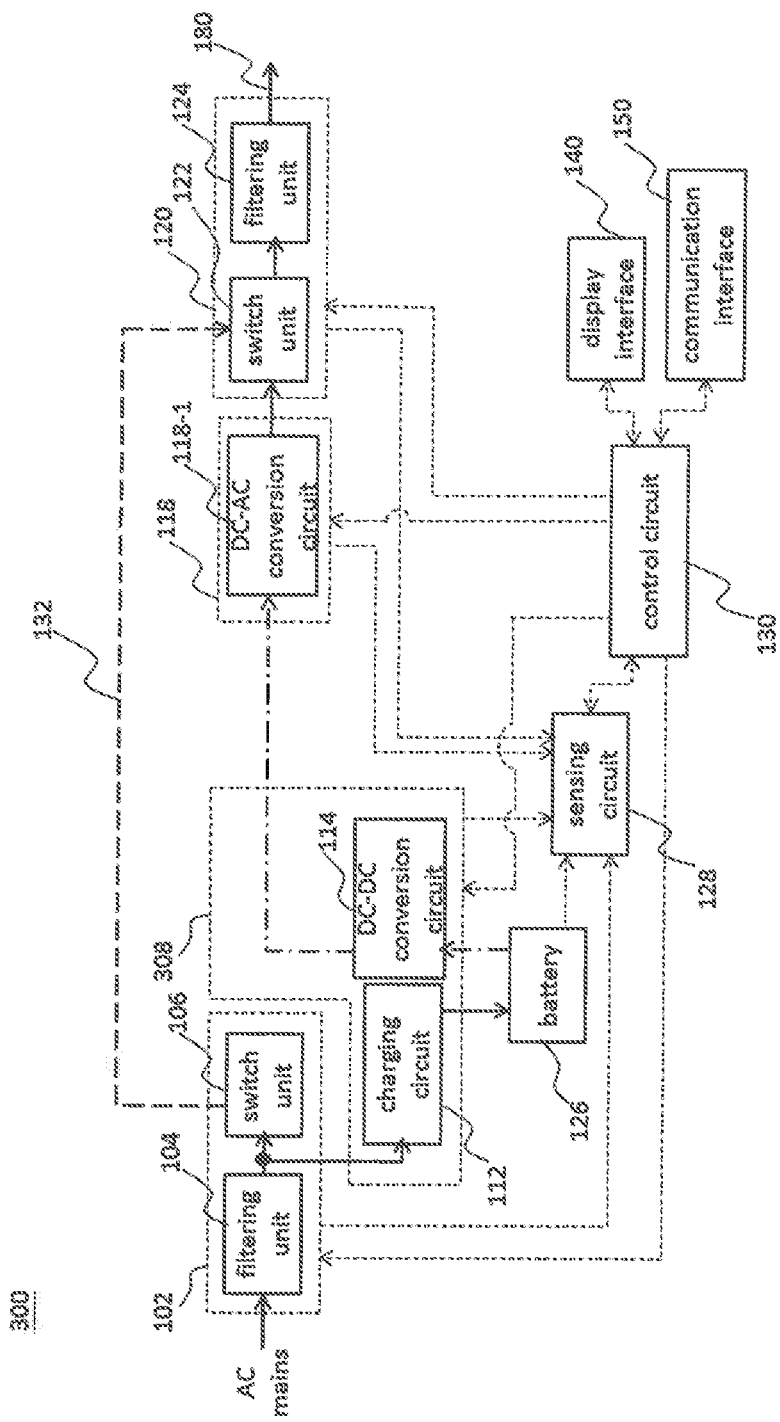
FIG. 3 shows an uninterruptible power system according to another embodiment of the present invention.

FIG. 3 shows an uninterruptible power system according to another embodiment of the present invention. In FIG. 3, the same reference numerals as those in FIG. 1 are denoted as the same members. Referring to FIG. 3, the uninterruptible power system 300 is an off-line uninterruptible power system, which has a plurality of function blocks that form the topology structure of the uninterruptible power system 300. The function blocks comprise an input unit 102, a first voltage conversion unit 308, a second voltage conversion unit 118, an output unit 120, and a battery 126. In this embodiment, the first voltage conversion unit 308 comprises a charging circuit 112 and a DC-DC conversion circuit 114. Since the first voltage conversion unit 308 does not have a power factor correction circuit, the status numbers and their corresponding status information in the lookup table used by the uninterruptible power system 300 need to be modified correspondingly.

Figure 4:
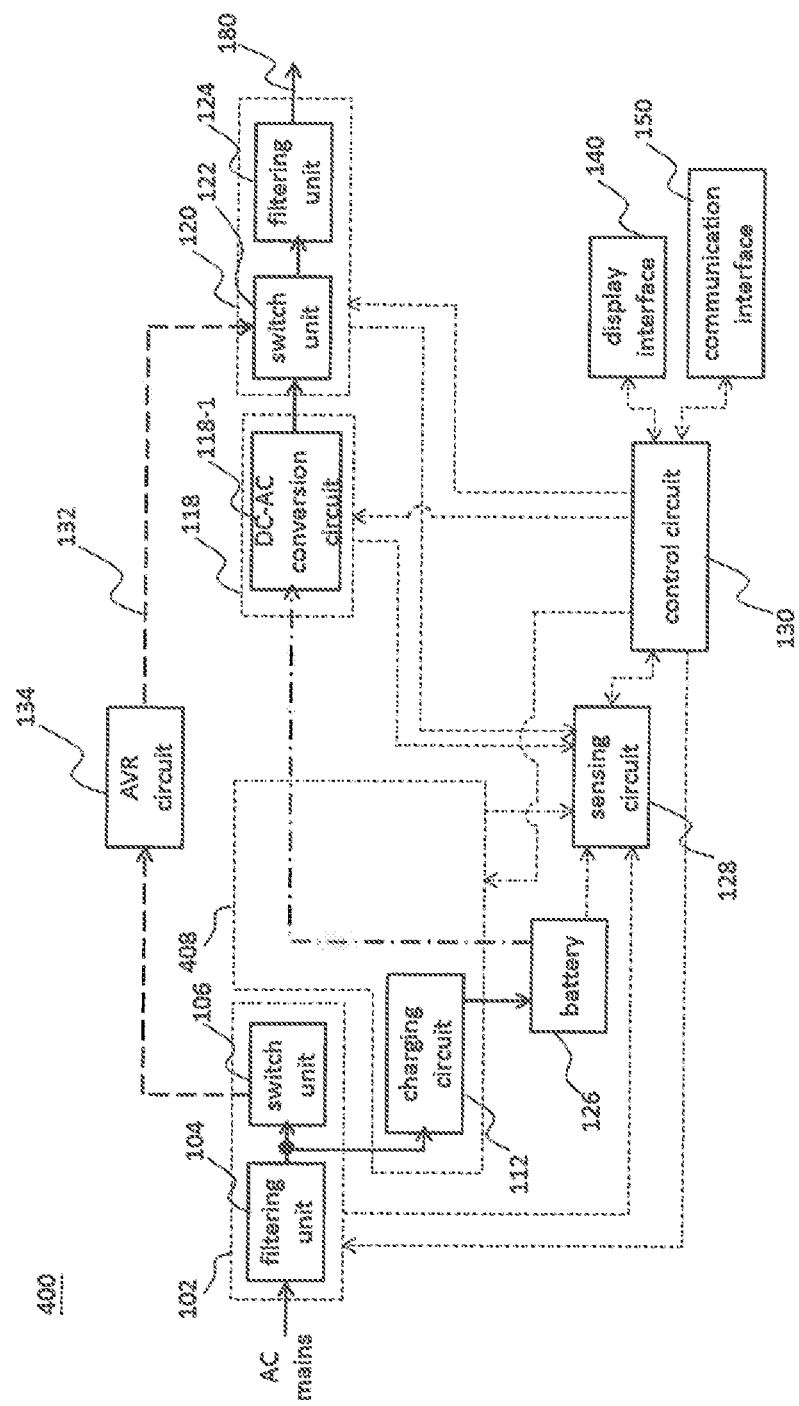
FIG. 4 shows an uninterruptible power system according to still another embodiment of the present invention.

FIG. 4 shows an uninterruptible power system according to still another embodiment of the present invention. In FIG. 4, the same reference numerals as those in FIG. 1 are denoted as the same members. Referring to FIG. 4, the uninterruptible power system 400 is a line-interactive uninterruptible power system, which has a plurality of function blocks that form the topology structure of the uninterruptible power system 400. The function blocks comprise an input unit 102, a first voltage conversion unit 408, a second voltage conversion unit 118, an output unit 120, a battery 126, and an automatic voltage regulation circuit (AVR circuit) 134. In this embodiment, the first voltage conversion unit 408 comprises only the charging circuit 112. Since the first voltage conversion unit 408 does not have a power factor correction circuit and a DC-DC conversion circuit, and the uninterruptible power system 400 is additionally configured with the automatic voltage regulation circuit 134, the status numbers and their corresponding status information in the lookup table used by the uninterruptible power system 400 need to be modified correspondingly.

Figure 5:
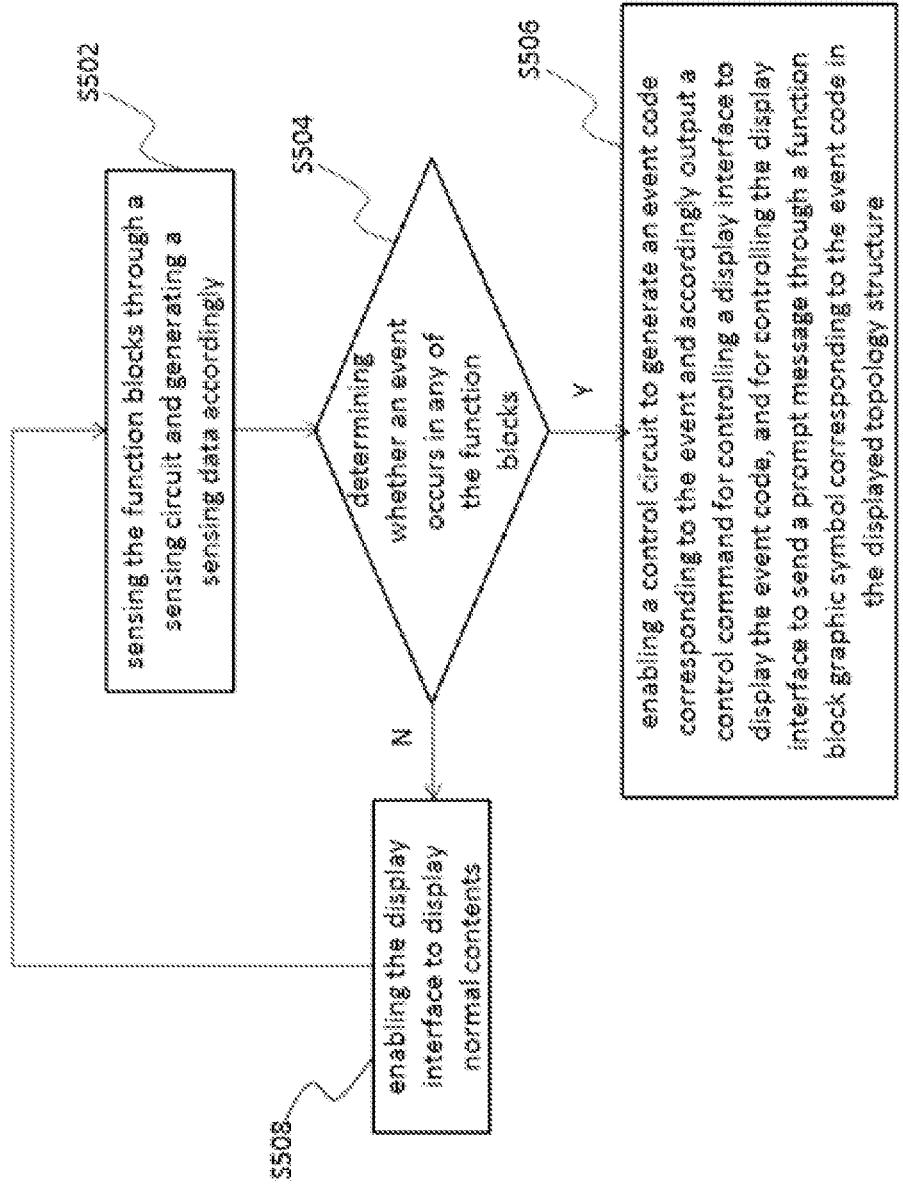
FIG. 5 shows the operation flow of an operation method of an uninterruptible power system according to an embodiment of the present invention.

According to the description of the above embodiments, those of ordinary skill in the art should be able to summarize some basic operational steps of the uninterruptible power system according to the present invention, as shown in FIG. 5. FIG. 5 shows the operation flow of an operation method of an uninterruptible power system according to an embodiment of the present invention. The uninterruptible power system has a plurality of function blocks that form the topology structure of the uninterruptible power system. The operation method comprises the following steps: sensing the function blocks through a sensing circuit and generating a sensing data accordingly (as shown in step S502); determining whether an event occurs in any of the function blocks according to the sensing data (as shown in step S504); and when the determination is yes, enabling a control circuit to generate an event code corresponding to the event and accordingly output a control command for controlling a display interface to display the event code, and for controlling the display interface to send a prompt message through a function block graphic symbol corresponding to the event code in the displayed topology structure (as shown in step S506). In addition, in step S504, when the determination is no, enabling the display interface to display normal contents (as shown in step S508). That is, in this case, the display interface does not display the event code, and the display interface does not send a prompt message through any of the displayed function block graphic symbols.

In summary, by the above operation, the uninterruptible power system of the present invention can provide intuitive information to the user in the event of a malfunction or an event that requires warning to the user, so that the user can quickly troubleshoot or respond.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An uninterruptible power system, having a plurality of function blocks forming a topology structure of the uninterruptible power system, the uninterruptible power system comprising:
   a sensing circuit, for sensing the function blocks and generating a sensing data;
   a display interface, for displaying the topology structure, wherein the topology structure displayed by the display interface comprises a plurality of function block graphic symbols and shows a connecting relationship of the function blocks; and
   a control circuit, for determining, according to the sensing data, whether an event occurs in any of the function blocks, wherein when the determination is yes, the control circuit generates an event code corresponding to the event and outputs a control command accordingly, the control command is used to control the display interface to display the event code, emit light through a function block graphic symbol or its surroundings corresponding to the event code, or flash a function block graphic symbol or its surroundings corresponding to the event code, wherein the event code comprises at least two characters, the characters are divided into two parts, a part of the characters represents an index, the other part of the characters represents a status number corresponding to a status information of the uninterruptible power system, the control circuit is further configured to search out a function block corresponding to the index from a lookup table, and generate the control command, wherein the lookup table records the correspondence between the function blocks and a plurality of different indexes.

2. The uninterruptable power system as claimed in claim 1, wherein the lookup table is stored in an internal memory space of the control circuit, or stored in an external memory electrically coupled to the control circuit.

3. The uninterruptible power system as claimed in claim 1, wherein the display interface comprises an LCD, an EPD, a plasma display, or an OLED display.

4. The uninterruptible power system as claimed in claim 3, wherein the LCD comprises a graphic LCD, the graphic LCD comprises a patterned transparent film and a monochrome LCD.

5. The uninterruptible power system as claimed in claim 1, wherein the function blocks comprise an input unit, a first voltage conversion unit, a second voltage conversion unit, an output unit, and a battery.

6. The uninterruptible power system as claimed in claim 5, wherein the uninterruptible power system is an on-line uninterruptible power system, the input unit comprises a first switch unit, the output unit comprises a second switch unit, the second voltage conversion unit comprises a DC-AC conversion circuit, and the first voltage conversion unit comprises a power factor correction circuit, a charging circuit and a DC-DC conversion circuit.

7. The uninterruptible power system as claimed in claim 5, wherein the uninterruptible power system is an off-line uninterruptible power system, the input unit comprises a first switch unit, the output unit comprises a second switch unit, the second voltage conversion unit comprises a DC-AC conversion circuit, and the first voltage conversion unit comprises a charging circuit and a DC-DC conversion circuit.

8. The uninterruptible power system as claimed in claim 5, wherein the uninterruptible power system is a line-interactive uninterruptible power system, the function blocks of the line-interactive uninterruptible power system further comprise an automatic voltage regulation circuit, the input unit comprises a first switch unit, the output unit comprises a second switch unit, the second voltage conversion unit comprises a DC-AC conversion circuit, and the first voltage conversion unit is a charging circuit.

9. An operation method of an uninterruptible power system, the uninterruptible power system having a plurality of function blocks and a display interface, the function blocks forming a topology structure of the uninterruptible power system, and the display interface displaying the topology structure, wherein the topology structure displayed by the display interface comprises a plurality of function block graphic symbols and shows a connection relationship of the function blocks; and the operation method comprising:
sensing the function blocks through a sensing circuit and generating a sensing data accordingly;
determining whether an event occurs in any of the function blocks according to the sensing data; and
when the determination is yes, enabling a control circuit to generate an event code corresponding to the event and accordingly output a control command for controlling the display interface to display the event code, emit light through a function block graphic symbol or its surroundings corresponding to the event code,
wherein the event code comprises at least two characters, the characters are divided into two parts, a part of the characters represents an index, and the other part of the characters represents a status number corresponding to a status information of the uninterruptible power system,
wherein the control circuit is further configured to search out a function block corresponding to the index from a lookup table, and generate the control command, and
wherein the lookup table records the correspondence between the function blocks and a plurality of different indexes.

* * * * *